United States Patent [19]
Wszolek et al.

[11] Patent Number: 5,732,226
[45] Date of Patent: Mar. 24, 1998

[54] APPARATUS FOR GRANTING EITHER A CPU DATA BUS OR A MEMORY DATA BUS OR A MEMORY DATA BUS ACCESS TO A PCI BUS

[75] Inventors: Philip Wszolek, Phoenix; Rodney James Pesavento, Chandler; Brian Neil Fall, Chandler; James Crawford Steele, Chandler, all of Ariz.

[73] Assignee: VLSI Technology, Inc., San Jose, Calif.

[21] Appl. No.: 629,011

[22] Filed: Apr. 8, 1996

[51] Int. Cl.⁶ .................................................. G06F 13/36
[52] U.S. Cl. ................. 395/287; 395/288; 364/242.92; 364/240.2; 364/238.4
[58] Field of Search ............................ 395/287–305, 395/308–310, 856–871, 726–732, 477–479; 364/242.92, 240.2, 238.4

[56] References Cited

U.S. PATENT DOCUMENTS

| | | | |
|---|---|---|---|
| 4,535,330 | 8/1985 | Carey et al. | 340/825.5 |
| 4,543,629 | 9/1985 | Carey et al. | 395/287 |
| 4,937,733 | 6/1990 | Gillett, Jr. et al. | 395/288 |
| 4,980,854 | 12/1990 | Donaldson et al. | 395/297 |
| 5,068,781 | 11/1991 | Gillett, Jr. et al. | 395/288 |
| 5,187,779 | 2/1993 | Jeddeloh et al. | 395/308 |
| 5,392,404 | 2/1995 | Thompson | 395/860 |
| 5,444,855 | 8/1995 | Thompson | 395/287 |
| 5,598,542 | 1/1997 | Leung | 395/297 |

*Primary Examiner*—Lance Leonard Barry
*Attorney, Agent, or Firm*—LaValle D. Ptak

[57] ABSTRACT

A link system controller is interposed between a PCI bus and the data bus and memory data bus of a personal computer system to normally allow transfer of write information from the PCI bus to DRAM memories on the memory data bus. Whenever a request is made for the transfer of data to the CPU data bus, a CPU bus interface controller requests release of the system from the DRAM controller. The DRAM controller then grants permission or releases control to the CPU bus interface whenever the DRAM controller is not writing data out to the DRAM data bus. When this release is effected, the transfer of write data to the memory data bus is prevented and transfer of data to the CPU data bus is enabled. This prevents simultaneous switching of the devices on both the CPU data bus and the memory data bus, to reduce the generation of noise; so that the operation of the IC system device is not impaired.

7 Claims, 1 Drawing Sheet

5,732,226

APPARATUS FOR GRANTING EITHER A CPU DATA BUS OR A MEMORY DATA BUS OR A MEMORY DATA BUS ACCESS TO A PCI BUS

RELATED APPLICATION

This application is related to co-pending application Ser. No. 08/628,969.

BACKGROUND

Personal computers in widespread use today include various buses for handling data and memory in different parts of the computer system. There is a central processor unit (CPU) data bus, as well as a memory data bus in these systems, for transferring data to and from memory and to and from the CPU of the system. These data buses operate synchronously with the clock of the CPU. In addition, an asynchronous PCI bus is employed to supply signals to each of the other data buses in the system.

Whenever the output drivers of an integrated circuit (IC) device switch, noise is generated on the power and ground buses of the device. As a consequence, the generated noise increases as the number of devices switching simultaneously increases. Situations can arise where the generated noise causes erroneous operation of the devices or other components in the system. A brute force solution is to have a large number of power and ground connections to each IC device. This results in a low enough inductance that the noise generated is maintained at a sufficiently low level to prevent impairment of the operation of the IC device. Obviously, such a solution necessarily is limited, since there is a practical physical limitation on the number of power and ground connections which can be made to the IC device.

For some systems in the past, the problem also has been addressed by designing the bus protocols so that the address bus and the data bus of the system are prevented from switching on the same rising edge of the input clock. Special protocols must be used, however, for such systems.

In systems where information is obtained asynchronously from a PCI bus, it is possible to have both the address bus and the data bus (such as the memory data bus and the CPU data bus) switching simultaneously, thereby creating the possibility of erroneous operation as a result of generated switching noise.

Accordingly, it is desirable to limit the number of output drivers on the IC device which can switch simultaneously, thereby reducing the number of power and ground connections required.

SUMMARY OF THE INVENTION

It is an object of this invention to provide an improved system controller for controlling the transfer of data in a personal computer system.

It is an additional object of this invention to provide an improved link system controller in a computer system for controlling the transfer of data from a PCI bus to a CPU data bus and a memory data bus.

It is another object of this invention to provide a system controller in a computer system employing an arbitrator for limiting the switching signals applied to the CPU data bus and the memory data bus of a computer on any given clock edge to one or the other of such buses but not both.

In accordance with a preferred embodiment of the invention, a link system for controlling the transfer of data from a PCI bus to a CPU data bus and a memory data bus includes an interface controller connected between the PCI bus and the CPU data bus and memory data bus. The controller operates normally to permit the writing of data to the memory data bus from the PCI bus and upon requests for permission to drive data onto the CPU data bus, the system switches to disable data transfer to the memory data bus and to enable transfer to the CPU data bus. After transfer of data to the CPU data bus is completed, the system reverts back to enabling the transfer of data onto the memory data bus until another request to drive data onto the CPU data bus is produced.

DETAILED DESCRIPTION

Figure 1:
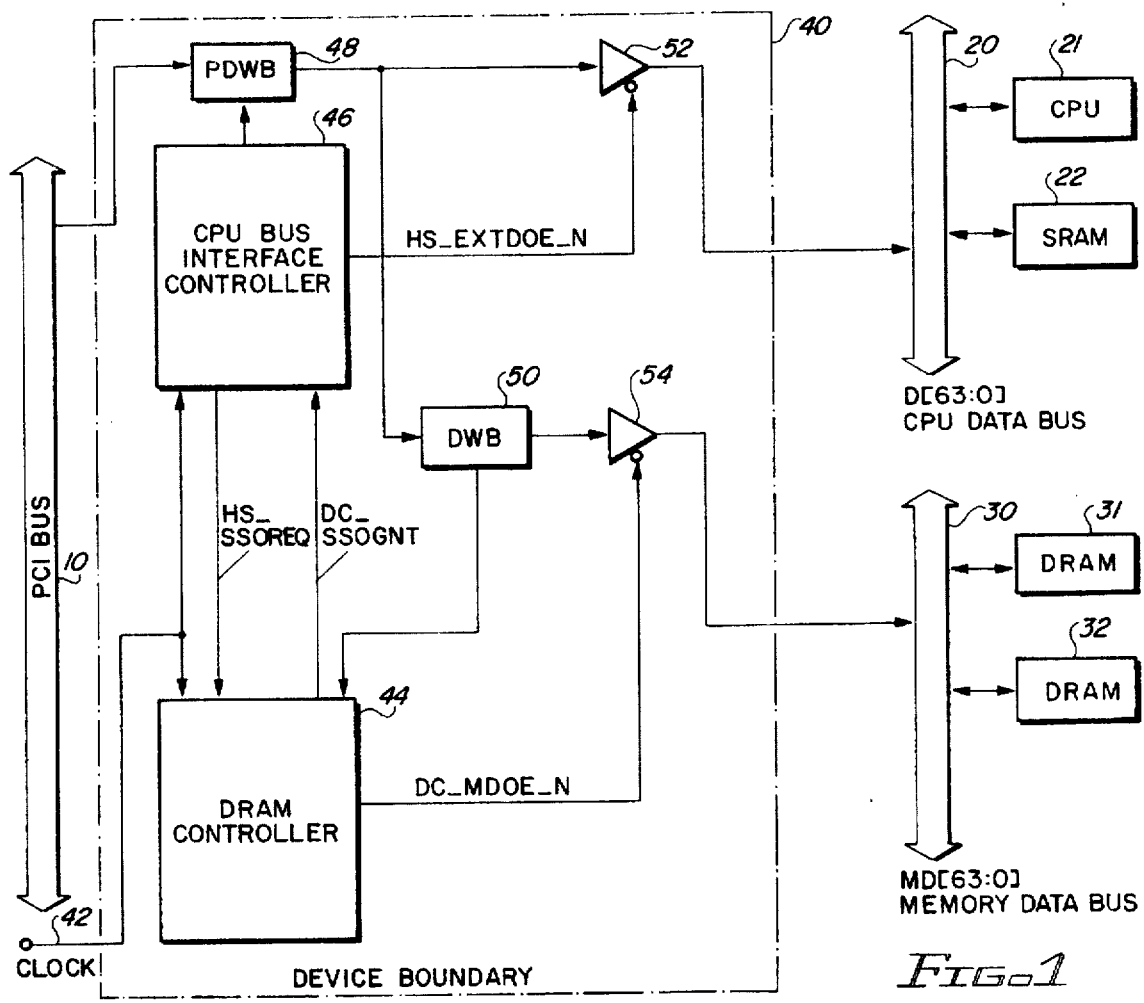
FIG. 1 is a block diagram of a preferred embodiment of the invention.

Reference now should be made to the drawing, in which FIG. 1 is a block diagram of a link system controller for controlling the transfer of data from an asynchronous PCI bus 10 to a CPU data bus 20 and to a DRAM memory data bus 30. As illustrated in FIG. 1, both the CPU data bus 20 and the memory data bus 30 are 64 bit buses. The CPU data bus 20 is identified as D[63:0] and the memory data bus 30 is identified as MD[63:0].

As shown in FIG. 1, the data bus 20 transfers data to and from a conventional CPU 21 and also to and from a static RAM memory (SRAM) 22. The memory 22 does not need refreshing, and it is a cache RAM memory of the type widely used with a CPU 21. Other components (not shown) may be connected to the CPU data bus 20 in a conventional manner.

Similarly, the memory data bus 30 is illustrated as having two dynamic random access memory (DRAM) units 31 and 32 attached to it. As is well known, these memories continually need refreshing at periodic intervals; and data is written into and read from these memories in the operation of the system including the CPU 21 and data bus 20 with which they are associated. The transfer of data to and from the buses 20 and 30 is effected on a synchronous basis from a common clock associated with the CPU 21. This is conventional operation; and the details of the system interconnections are not shown as a result.

In addition to the buses 20 and 30, systems of the type shown in FIG. 1 also receive data from a PCI asynchronous bus 10, shown on the left-hand side of FIG. 1. The data which is transferred from the bus 10 is directed to either or both of the buses 20 and 30 and absent some type of control, it is possible for simultaneous data transfer on the 64 leads of both buses 20 and 30 from the PCI bus 10 to take place. This would result in a large number of output drivers on the system IC device switching simultaneously, creating problems of generated noise on the power and ground connections, as described previously.

In order to limit the required number of power and ground connections to the IC device, the link system controller 40 shown in FIG. 1 has been designed to prevent the simultaneous switching of data from the PCI bus 10 to the buses 20 and 30. This is effected by means of a CPU bus interface controller 46 and a DRAM controller 44 in the link system controller system 40. The operation of the controllers 44 and 46 is effected in synchronism with clock signals on a lead 42 from the CPU 21, thereby synchronizing the operation of the circuit 40 with the operation of the devices on the CPU data bus 20 and memory data bus 30.

Whenever data is to be written from the PCI bus 10 into either of the DRAM memories 31 and 32 on the memory data bus 30 or is to be supplied to the CPU data bus 20, the data is supplied to a PCI to DRAM write buffer (PDWB) 48 in the link system controller 40. This buffer is a standard multi-stage buffer. The signals pass through the buffer 48 and are supplied in parallel to a buffer amplifier 52 and a second DRAM write buffer (DWB) 50. The output of the DRAM write buffer 50, in turn, is supplied to the input of a buffer amplifier 54.

As illustrated in FIG. 1, the buffer amplifiers 52 and 54 both are gated amplifiers; and they are selectively enabled by signals obtained from the CPU bus interface controller 46 and the DRAM controller 44, respectively. Whenever the signal on the enable inputs to the buffers 52 and 54 is high, the respective buffer amplifiers 52 and 54 are disabled or prevented from passing data therethrough. Similarly, whenever the signal applied to the enable inputs of the buffer amplifiers 52 or 54 is low, the respective buffer amplifier is enabled to pass data signals therethrough.

Figure 2:
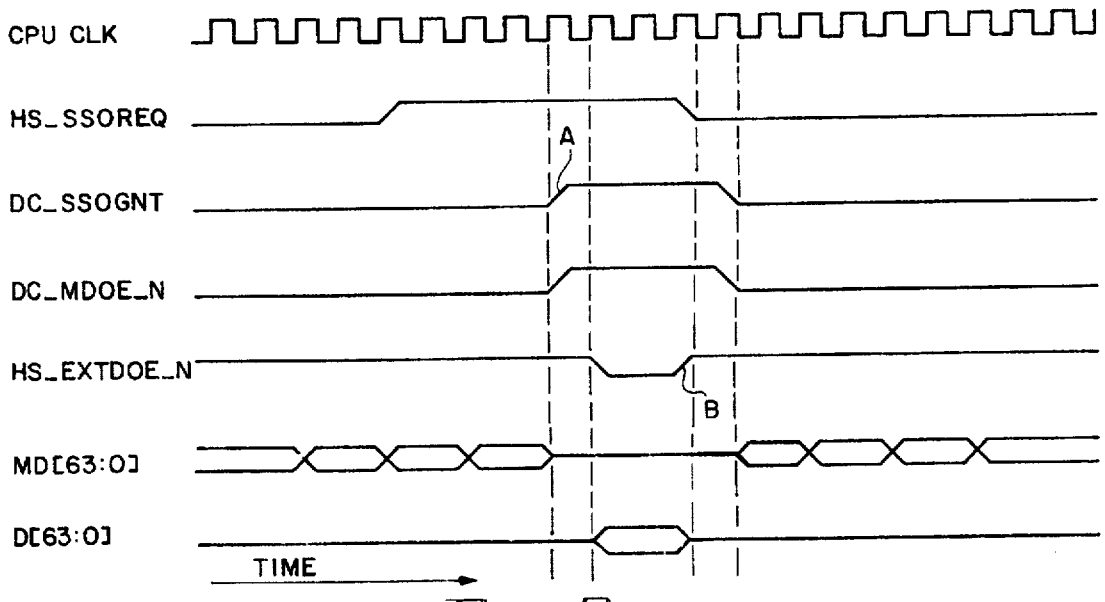
FIG. 2 is timing diagram useful in describing the operation of FIG. 1.

Normally the DRAM controller 44, in the default mode of operation of the system, supplies a low enable output on the lead connected to the enable input of the buffer amplifier 54. This is shown in FIG. 2 on the waveform labeled DC_MDOE_N (DRAM controller memory data output enable). At the same time, from an examination of FIG. 2, the output supplied by the CPU bus interface controller 46 to the enable input of the buffer amplifier 52 is high; and this is identified as the signal HS_EXTDOE_N (host/slave external data output enable).

It should be noted that the controllers 44 and 46 are operated in synchronism by means of the clock signals applied over the lead 42. These clock signals are shown in the top waveform of FIG. 2. FIG. 2 also shows the various other waveforms of the signals occurring on correspondingly identified leads in FIG. 1.

The nature of the signals obtained from the PCI bus and being transferred or supplied to one or the other of the buses 20 and 30 is established by address signals supplied from the PCI bus 10. Normally, in the default mode, the DRAM controller 44 is enabled to cause data to pass through the buffer amplifier 54 from the DRAM write buffer DWB 50. Whenever the buffer 50 is empty or the system is reading the DRAM memories 31 or 32 or refreshing these memories, a signal is applied from the buffer 50 to the controller 44 indicating this condition and terminating the transfer of data through the buffer amplifier 54 to the bus 30.

Whenever a signal is obtained from the PCI bus 10 indicating that data is to be transferred to the bus 20 from the PCI bus 10, the address in the PDWB buffer 48 is recognized by the CPU bus interface controller 46. The controller 46 then supplies a host/slave simultaneous switching output request (HS_SSOREQ) to the DRAM controller 44, as indicated in the waveform HS_SSOREQ shown in FIG. 2. This request is a low-to-high waveform transition, as shown in FIG. 2. When this signal is received by the DRAM controller 44, a predetermined number of clock periods later (to permit the transfer of all of the write data signals from the buffer 50 through the buffer amplifier 54 to the bus 30), the DRAM controller 44 supplies a DRAM controller simultaneous switching output grant signal DC_SSOGNT to the CPU bus interface controller 46. This is indicated at "A" in FIG. 2. At the same time, the enable signal DC_MDOE_N applied to the buffer amplifier 54 is removed (going from low to high), as shown in FIG. 2. Consequently, no more data can be transferred through the buffer amplifier 54 to the bus 30. On the next clock pulse following this occurrence, the CPU bus interface controller 46 supplies a low enabling signal HS_EXTDOE_N to the enable input of the buffer amplifier 52, opening that amplifier to pass data therethrough from the output of the PDWB buffer 48. At the termination of this transfer (shown at B in FIG. 2), the system reverts back to the original default condition of operation, as illustrated.

As shown in FIG. 2, during the time the buffer amplifier 54 is enabled to pass data, data is supplied through it to the memory bus 30, as shown at MD[63:0] in FIG. 2. During the time the amplifier 54 is disabled and the buffer amplifier 52 is enabled, data is passed through the buffer amplifier 52 to the bus 20, as illustrated in FIG. 2 at D[63:0].

As can be seen from an examination of FIG. 2, the operation of the link system controller 40 prevents simultaneous switching of drivers on the data buses 20 and 30. Thus, the generated noise is maintained at a low enough level so that it does not impair the functionality of the IC device associated with the system shown in FIG. 1. This is clear in FIG. 2 where, as shown at A on the waveform DC_SSOGNT, the transfer of data to the memory data bus 30 is terminated with a one-cycle clock delay before data is transferred to the data bus 20. Similarly, at the end of the transfer of the data on the data bus 20 at B on the waveform HS_EXTDOE_N, there is another one-clock delay before data transfer through the buffer amplifier 54 to the memory data bus 30 MD[63:0] resumes.

The foregoing description of the preferred embodiment of the invention is to be considered as illustrative and not, as limiting. Various modifications will occur to those skilled in the art for performing substantially the same function, in substantially the same way, to achieve substantially the same result without departing from the true scope of the invention as defined in the appended claims.

What is claimed is:

1. A link system in a computer system for controlling the transfer of data from a PCI bus to a CPU data bus and a memory data bus including in combination:

first and second buffers each having a data input coupled with a PCI bus, an enable input for controlling passage of data therethrough, and a data output, with the data output of said first buffer coupled with a CPU data bus, and the data output of said second buffer coupled with a memory data bus;

a CPU bus interface controller having an output connected with the enable input of said first buffer;

a memory data bus controller having an output coupled with the enable input of said second buffer, said second buffer normally being enabled by said memory data bus controller to pass data signals therethrough, and said first buffer normally being disabled by said CPU bus interface controller to prevent data signals from passing therethrough; and interconnections between said CPU bus interface controller and said memory data bus controller for supplying switching output requests from said CPU bus interface controller to said memory data bus controller and for supplying switching output grants from said memory data bus controller to said CPU bus interface controller, such that when a switching output grant is supplied from said memory data bus controller to said CPU bus interface controller, said CPU bus interface controller supplies an enable signal to said first buffer and said memory data bus controller removes said enable signal from said second buffer for the duration of said switching output grant signal from said memory data bus controller.

2. The combination according to claim 1 further including a source of clock signals coupled with said CPU bus interface controller and said memory data bus controller for synchronizing the operations of said controllers.

3. The combination according to claim 2 further including a third multi-stage buffer connected between said PCI bus and the data input of said first buffer and a fourth multi-stage buffer connected between the output of said first buffer and the data input of said second buffer.

4. The combination according to claim 3 wherein said third multi-stage buffer is coupled with said CPU bus interface controller and said fourth multi-stage buffer is coupled with said memory data bus controller for providing signals to said controllers indicative of data in said third and fourth buffers, respectively, for initiating switching output requests from said CPU bus interface controller and switching output grants from said memory data bus controller.

5. The combination according to claim 1 further including a third multi-stage buffer connected between said PCI bus and the data input of said first buffer and a fourth multi-stage buffer connected between the output of said first buffer and the data input of said second buffer.

6. The combination according to claim 5 wherein said third multi-stage buffer is coupled with said CPU bus interface controller and said fourth multi-stage buffer is coupled with said memory data bus controller for providing signals to said controllers indicative of data in said third and fourth buffers, respectively, for initiating switching output requests from said CPU bus interface controller and switching output grants from said memory data bus controller.

7. A link system in a computer system for controlling the transfer of data from a PCI bus to a CPU data bus and a memory data bus including in combination:

first and second buffers each having a data input coupled with a PCI bus, an enable input for controlling passage of data therethrough, and a data output, with the data output of said first buffer coupled with a CPU data bus, and the data output of said second buffer coupled with a memory data bus;

a CPU bus interface controller having an output connected with the enable input of said first buffer;

a memory data bus controller having an output coupled with the enable input of said second buffer, said second buffer being enabled by said memory data bus controller to pass data signals therethrough, and said first buffer being enabled by said CPU bus interface controller to pass data signals therethrough; and interconnections between said CPU bus interface controller and said memory data bus controller for supplying switching output requests from one of said CPU bus interface controller and said memory data bus controller to the other of said CPU bus interface controller and said memory data bus controller, and for supplying switching output grants from the other of said memory data bus controller and said CPU bus interface controller to said one of said CPU bus interface controller and said memory data bus controller, such that when a switching output grant is supplied from said other controller to said one controller, said one controller supplies an enable signal to said corresponding one of said first and second buffers and said other controller removes said enable signal from said corresponding one of said first and second buffers for the duration of said switching output grant signal.

* * * * *